(12) United States Patent
Ethington et al.

(10) Patent No.: US 7,788,998 B2
(45) Date of Patent: Sep. 7, 2010

(54) PRECISION MACHINING SYSTEM AND METHODS

(75) Inventors: Jon Ethington, Beverly, MA (US); Xinbing Liu, Acton, MA (US)

(73) Assignee: Panasonic Corporation, Osaka (JP)

(*) Notice: Subject to any disclaimer, the term of this patent is extended or adjusted under 35 U.S.C. 154(b) by 859 days.

(21) Appl. No.: 11/374,373

(22) Filed: Mar. 13, 2006

(65) Prior Publication Data
US 2007/0221019 A1    Sep. 27, 2007

(51) Int. Cl.
B23B 5/36 (2006.01)
B23B 5/00 (2006.01)

(52) U.S. Cl. .................. 82/123; 82/161; 82/158; 310/328

(58) Field of Classification Search .......... 310/328; 82/1.5, 123, 173, 904, 158, 163, 161
See application file for complete search history.

(56) References Cited

U.S. PATENT DOCUMENTS

| | | | | |
|---|---|---|---|---|
| 4,864,904 A * | 9/1989 | Mishiro | ............... | 82/137 |
| 7,178,433 B2 * | 2/2007 | Matsuda et al. | ............... | 82/1.11 |
| 2003/0035231 A1 | 2/2003 | Epstein et al. | | |
| 2007/0052326 A1 * | 3/2007 | Liu | ............... | 310/323.18 |
| 2007/0180961 A1 * | 8/2007 | Imai et al. | ............... | 82/1.5 |
| 2007/0295175 A1 * | 12/2007 | Akiyama | ............... | 82/117 |
| 2008/0019782 A1 * | 1/2008 | Imai et al. | ............... | 407/11 |

FOREIGN PATENT DOCUMENTS

| | | | | |
|---|---|---|---|---|
| DE | 2935829 | A | * | 8/1980 |
| JP | 62292306 | A | * | 12/1987 |
| JP | 07164217 | A | * | 6/1995 |
| JP | 09309001 | A | * | 12/1997 |
| JP | 2006001008 | A | * | 1/2006 |
| JP | 2006320995 | A | * | 11/2006 |
| JP | 2006326812 | A | * | 12/2006 |
| SU | 1227375 | A | * | 4/1986 |
| SU | 1741981 | A1 | * | 6/1992 |
| WO | WO 2007114034 | A1 | * | 10/2007 |

OTHER PUBLICATIONS

English translation of JP 2006-1008A (pp. 1-19).*

* cited by examiner

Primary Examiner—Boyer D Ashley
Assistant Examiner—Sara Addisu
(74) Attorney, Agent, or Firm—RatnerPrestia

(57) ABSTRACT

A precision machining system with a variable projected machining width of the cutting surface of the machining tool, including: a workpiece holder to hold a workpiece; a machining tool holder to hold the machining tool such that the Z axis is substantially parallel to the tool's centerline; a Z translation stage and an X translation stage each coupled to one of the workpiece holder or the machining tool holder; a workpiece spindle coupled to the workpiece holder to rotate the workpiece about the workpiece axis that is parallel to the Z axis; a machining path controller electrically coupled to the X translation stage and the workpiece spindle; and a tool spindle coupled to the machining tool holder. The tool spindle rotates the machining tool about the centerline of the machining tool, which varies the width of the cutting surface of the machining tool projected perpendicular to the machining path.

15 Claims, 4 Drawing Sheets

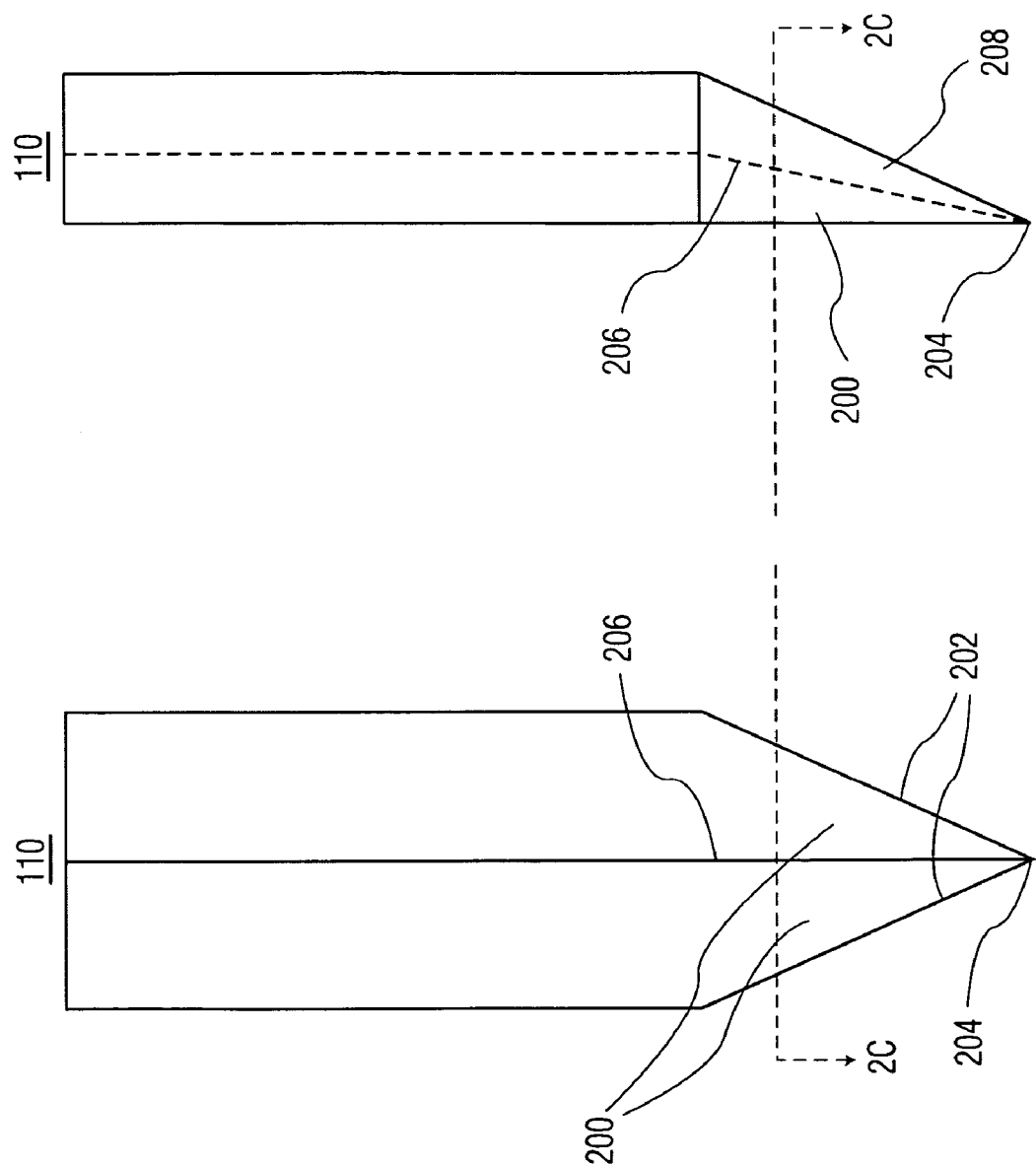

PRECISION MACHINING SYSTEM AND METHODS

FIELD OF THE INVENTION

The present invention concerns methods of precision machining and a precision machining system that may be used to perform these methods. In particular, these methods may be used to produce microstructures having reduced feature sizes and improve surface profiles.

BACKGROUND OF THE INVENTION

Diamond machining offers high accuracy and surface finish, and is suitable for fabricating optical-grade molds for making optical components, such as lenses and gratings. For example, diamond tools may be used to machine Ni molds for making gratings used in optical pickup devices. Diamond turning, fly-cutting, and vibration assisted machining (VAM) are three precision diamond machining methods that have been tried. However, each has limitations that cannot satisfy some imagined device geometry configurations for the optical pickups.

Two other diamond machining methods, slow tool servo (STS) and fast tool servo (FTS) have also been advanced as alternative precision machining methods for producing a number of these imagined device geometry configurations.

The STS technique expands the capability of a traditional diamond turning machine. It enables the creation of surface structures such as micro-prisms, torics, off-axis aspheres, and freeform optics in general. STS uses only the translation and/or rotation stages of an ultra-precision diamond turning machine to carry out all machining motion of the machining tool. Given these diamond turning machines contain powerful motion controllers, tool-path processing can be done by the machine itself. However, the available bandwidth of Z-motion (motion normal to the substrate surface) is determined by the limitations of the motion stages of diamond turning machine. Thus, the bandwidth for STS is often less than 10 Hz for the linear feed axes. Still freeform optics or diffractive patterns can be generalized and/or characterized by a function which determines machine tool position.

In FTS, a piezoelectric transduction actuator, linear motor, or voice coil actuator, drives a diamond tool in a single axis motion at high frequency. The range of motion can be 10's of microns to nearly 1 millimeter. Some systems provide 100 um of travel while maintaining 1 kHz bandwidth. The advantage of FTS is the increased bandwidth this add-on tool provides, over the traditional diamond turning machine axes. Several examples of FTS systems are available, including systems developed by the Precision Engineering Center (PEC) at the North Carolina State University and Precitech Inc.

The FTS system also expands the capability of a traditional diamond turning machine, enabling the creation of surface structures such as micro-prisms, torics, off-axis aspheres, and freeform surfaces in general. For example, using the Precitech system, the tool path software uses a C-program or bitmap image to describe the desired part topography. An external general purpose computer with a digital signal processor uses high resolution angular feedback on the work spindle and the linear position feedback of the machine translational slide to accomplish "real-time" calculations of the axial position of the tool. Both the Precitech and PEC FTS systems are designed to produce very high dynamic movement during the turning process with low mechanical noise.

A system utilizing the full capabilities of a four axis diamond turning machine, in conjunction STS or FTS may have additional capabilities that other traditional diamond turning and fly-cutting method do not allow. For example reduced tool lead-in and lead-out zones (transition zones) may be realized. Additionally, there is the potential of machining curved grooves in the work pieces using STS or FTS. These capabilities are desirable for making many types of optical components, including lenses and gratings, as well as molds for optical components that may be used in optical pickups.

Using FTS, if the linear speeds of the tool relative to the surface are similar to those used in VAM, the surface finish and cut quality may be maintained at levels comparable to those achieved using VAM. However, using either STS or FTS allows for machining with unique orientations between tool and workpiece that are not achievable with VAM, which may provides an FTS with the ability to satisfy device geometry requirements that may not be achieved with a VAM system. Tests done by the inventors have shown that optical performance of gratings may be maintained at linear speed rates of only 35 mm/min in electroless nickel.

A desired characteristic of some optical pickup designs is a minimum transition zone. It may possible to realize this with sharp tool lead-out by the coordination of diamond turning machine axes using STS or FTS. By using a full positioning diamond turning machine with either STS or FTS, the feed—controlled by the machine—may be slowed down to decrease linear surface speed. Given a fixed bandwidth and retraction time, this will effectively reduce the lead-out transition zone. Optical properties in the transition zones of these exemplary optical pickup designs may not be overly stringent. Therefore, the degradation of surface finish that may result from slowing the feed may be acceptable.

The present invention may extend the capabilities of either an STS or an FTS system by allowing for additional control of the shape of the groove machined by the precision machining system during each pass of the machining tool.

SUMMARY OF THE INVENTION

An exemplary embodiment of the present invention is a precision machining system with a variable projected machining width of the cutting surface of the machining tool, including: a workpiece holder to hold a workpiece for machining; a machining tool holder to hold the machining tool such that the Z axis is substantially parallel to the centerline of the machining tool; a Z translation stage coupled to the workpiece holder and/or the machining tool holder; an X translation stage coupled to the workpiece holder and/or the machining tool holder; a workpiece spindle coupled to the workpiece holder to rotate the workpiece about the workpiece axis that is parallel to the Z axis; a machining path controller electrically coupled to the X translation stage and the workpiece spindle; and a tool spindle coupled to the machining tool holder. The Z translation stage controls the relative Z position of the tip of the machining tool and a surface of the held workpiece. The workpiece spindle rotates the workpiece about the workpiece axis that is parallel to the Z axis. The machining path controller controls the X translation stage and the workpiece spindle such that the tip of the machining tool traverses a machining path on the surface of the held workpiece. The tool spindle rotates the machining tool about the centerline of the machining tool, which varies the width of the cutting surface of the machining tool projected perpendicular to the machining path.

Another exemplary embodiment of the present invention is a method of machining a surface of a workpiece using a precision machining system adapted to project the cutting surface of the machining tool with a variable machining width. The workpiece is mounted in the precision machining system. The tip of the machining tool is aligned over a starting location of the surface of the workpiece such that the cutting surface of the machining tool is substantially perpendicular to the surface of the workpiece. The machining tool is rotated about an axis substantially normal to the surface of the workpiece until the width of the cutting surface of the machining tool projected perpendicular to the machining path on the surface of the workpiece is a predetermined machining width. At least one of the workpiece or the machining tool is moved in a direction substantially normal to the surface of the workpiece until the tip of the machining tool is at a predetermined machining depth in the surface of the workpiece. At least one of the workpiece or the machining tool is moved substantially parallel to the surface of the workpiece such that the tip of the machining tool traverses the machining path on the surface of the workpiece.

A further exemplary embodiment of the present invention is a precision machining system adapted to project a cutting surface of a machining tool with a variable machining width, including: alignment means; tool rotation means; normal movement means; and parallel movement means. The alignment means aligning the tip of the machining tool over the surface of a workpiece such that the cutting surface of the machining tool is substantially perpendicular to the surface of the workpiece. The tool rotation means rotating the machining tool about an axis substantially normal to the surface of the workpiece to vary the width of the cutting surface of the machining tool projected perpendicular to a machining path on the surface of the workpiece. The normal movement means moving at least one of the workpiece or the machining tool in a direction substantially normal to the surface of the workpiece. The parallel movement means moving at least one of the workpiece or the machining tool substantially parallel to the surface of the workpiece.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawing are the following figures:

FIG. 2A is a front plan drawing illustrating an exemplary machining tool that may be used with the exemplary precision machining system of FIG. 1.

FIG. 2B is a side plan drawing illustrating the exemplary machining tool of FIG. 2A.

DETAILED DESCRIPTION OF THE INVENTION

Exemplary embodiments of the present invention involve augmenting either a slow tool servo (STS) or a fast tool servo (FTS) precision machining method to create a "projected" diamond shape profile. According to these exemplary embodiments, the machining tool may be rotated about its longitudinal axis; while the macroscopic tool feed direction is maintained so that a "projected" machining tool geometry may be realized. It is noted that, although the precision machining methods of the present invention may most often use a diamond machining tool, other machining tool materials, such as sapphire, silicon-carbide, tungsten, or tungsten-carbide, may be used as well.

The exemplary precision machining methods described above may be desirable to use for optical grating creation. Because these exemplary methods utilize features of STS or FTS, the reduced lead-in and lead-out advantages of coordinated motion systems may be realized. Additionally, using "projected" views of a mounted pre-shaped diamond may allow for greater precision in the shaping of fine features.

Because the machining tool is fixed in the plane of the workpiece surface in both the STS and FTS methods, it may be rotated relative to the tool feed direction. This allows for a creation of a "projected" tool geometry, and thus increasing the maximum aspect ratio that may be achieved. This increased aspect ratio capability may allow for features to be formed with a reduced machined pitch. Additionally angle sharper angles may be realized on features machined using exemplary methods of the present invention. These capabilities of exemplary methods of the present invention may be particularly desirable for producing Fresnel lenses and other diffractive optics or mold therefor, although the manufacture of many other microstructures may be possible using exemplary embodiments of the present invention.

Figure 1:
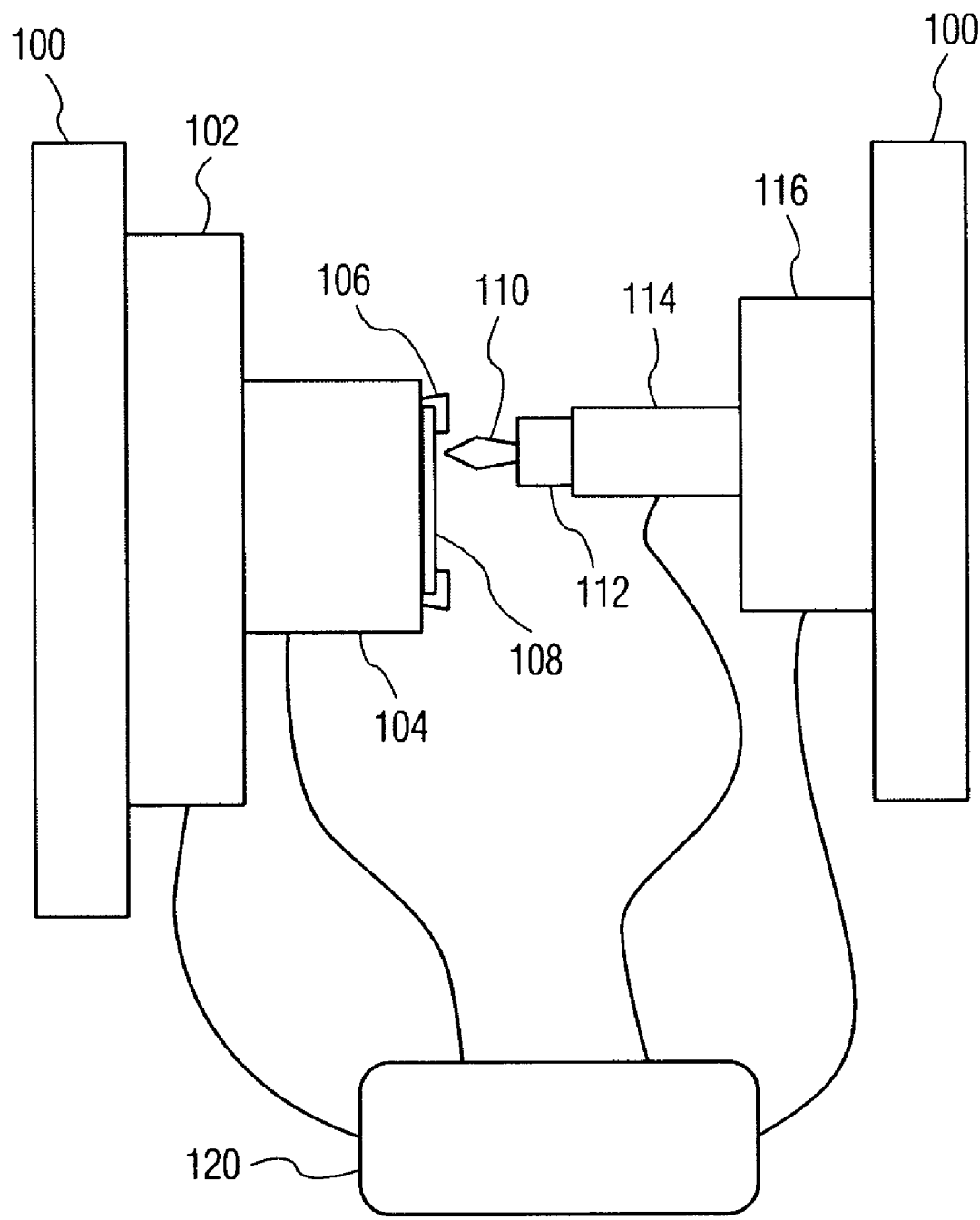
FIG. 1 is a side plan drawing illustrating an exemplary precision machining system with a variable projected machining width of the cutting surface of the machining tool according to the present invention.

FIG. 1 illustrates an exemplary precision machining system according to the present invention. This exemplary precision machining system is designed so that the cutting surface of machining tool 110 may be rotated to project a variable machining width perpendicular to a machining path on the surface of workpiece 108.

The exemplary precision machining system of FIG. 1 includes: base 100; translation stage 102 to move workpiece 108 along at least one axis parallel to its surface; workpiece spindle 104 to rotate the workpiece about an axis parallel to the Z axis; workpiece holder 106 to hold workpiece 108 during machining; Z translation stage 116 to control the relative Z position of the tip of machining tool 110 and the surface of workpiece 108; tool spindle 114 to rotate machining tool 110 about its centerline; machining tool holder 112 to hold machining tool 110 such that the centerline of the machining tool is substantially parallel to the Z axis; and machining path controller 120 to control motion of the system such that the tip of machining tool 110 traverses a predetermine machining path on the surface of workpiece 108.

If the exemplary precision machining system is a modified FTS machining system, then machining tool holder 112 may desirably include a vibration means (not shown) to vibrate machining tool 110 substantially parallel to the Z axis. As described above, this vibration means may be any of a number of different devices, such as a piezoelectric transducer, a linear motor, or a voice coil actuator. These various vibration means may typically have a maximum travel distance of less than about 200 μm, although it may be desirable for the maximum travel distance of the vibration means to be less than 100 μm. The bandwidth of the vibration means is typically less than about 2 kHz. This bandwidth, however, may be decreased if the maximum travel distance is increased. Although the vibration means may be coupled between other components of the exemplary precision machining system (e.g. between Z translation stage 116 and tool spindle 114), one skilled in the art will understand that increasing the mass vibrated by the vibration means may also decrease the vibration bandwidth.

In the exemplary embodiment of FIG. 1, translation stage 102 desirably includes an X translation stage to move workpiece 108 along a radius of workpiece spindle 104. Thus, circular, or spiral, machining paths may be easily machined using this exemplary system. Other arbitrary machining paths may be followed by the tip of machining tool 110 on the surface of workpiece 108 with this exemplary system by proper coordination of the motion of translation stage 102 and workpiece spindle 104. If the exemplary precision machining system is used to machine arbitrary machining paths in this manner, however, the orientation of the machining tool cutting surface relative to the machining path may vary at different points along the machining path unless the machining tool is rotated during the machining process to maintain a constant orientation.

It is noted that the machining of arbitrary machining paths may be simplified by including a Y translation stage within translation stage 102 as well. By coordinating motion between these three axes (X, Y, and Θ), using machining path controller 120, arbitrary machining paths may be followed by the tip of machining tool 110 on the surface of workpiece 108 while maintaining a desired orientation of the machining tool cutting surface relative to the machining path. This may be accomplished without rotating the machining tool during the machining process.

It is also noted that, in an alternative embodiment, workpiece spindle 104 may be omitted and translation stage 102, including both an X translation stage and a Y translation stage, may be used alone to provide motion to transcribe the machining path. However, this exemplary embodiment may require rotation of machining tool 110 to maintain a desired orientation of the cutting surface throughout the machining process, as in the embodiment with only radial and Θ motion.

In the exemplary embodiment of FIG. 1, translation stage 102, which includes an X translation stage and possibly a Y translation stage, is shown coupled into the system so as to move workpiece 108 and Z translation stage 116 is shown coupled into the system so as to move machining tool 110. As it is the relative motion of workpiece 108 or machining tool 110 that matters, one skilled in the art will understand that each of these two, or three, translation stages may be configured within the system to move either workpiece 108 or machining tool 110.

As described above, machining path controller 120 is electrically coupled to translation stage 102 and workpiece spindle 104 (if included) to control the relative motion of workpiece 108 and machining tool 110 such that the tip of machining tool 110 traverses a machining path on the surface of the held workpiece. Machining path controller 120 may be used to control the speed with which the tip of machining tool 110 traverses the machining path. This traversal speed may desirably be maintained at a machining speed throughout the bulk of the machining path. Machining path controller 120 may also be programmed to reduce the speed proximate to the starting and ending points of the machining path to reduce the lead-in and the lead-out transition lengths, respectively.

It is noted that machining path controller 120 may also desirably control Z translation stage 116 such that the tip of machining tool 110 maintains a desired machining depth in the surface of the held workpiece as the tip traverses the machining path. In the case of STS, machining path controller 120 may also drive Z translation stage 116 to provide a slow servo motion in the Z direction during machining. Additionally, active control of Z translation stage 116 may be desirable for machining workpiece surfaces that are not substantially planar.

Machining path controller 120 may include a number of processing elements including one or more of special purpose control circuitry, an application specific integrated circuit, a general purpose computer, and/or a digital signal processor.

Figure 2C:
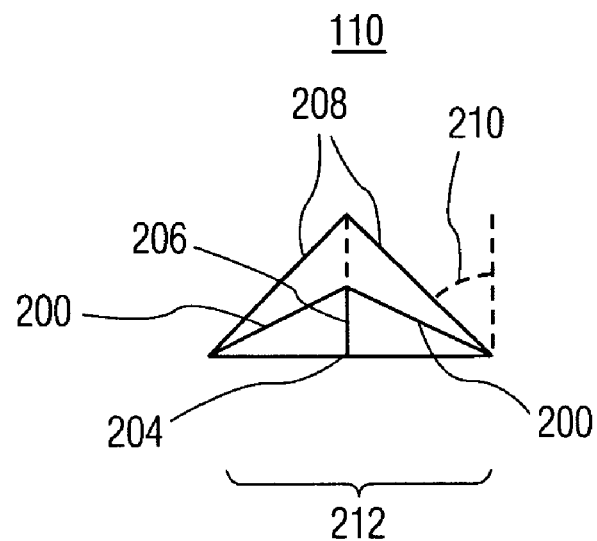
FIG. 2C is cut-away top plan drawing, cut along line 2C-2C in FIGS. 2A and 2B, illustrating the exemplary machining tool of FIGS. 2A and 2B.
Figure 2D:
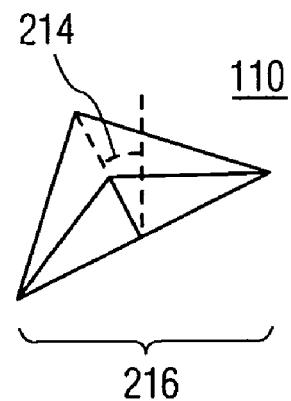
FIG. 2D is cut-away top plan drawing, cut along line 2C-2C in FIGS. 2A and 2B, illustrating the effect of rotating the exemplary machining tool of FIGS. 2A and 2B from the orientation shown FIG. 2C.

In this exemplary embodiment, tool spindle 114 is coupled to machining tool holder 112 to rotate machining tool 110 about its longitudinal centerline. As illustrated in FIGS. 2C and 2D, rotating machining tool 110 in this manner varies the width of its cutting surface projected normal to the machining path.

As noted above, in exemplary embodiments of the present invention machining tool 110 is rotated by tool spindle 114 such that the width of the cutting surface projected perpendicular to the machining path is reduced to a desired machining width less than the actual width of the cutting surface. To realize machining in this configuration, however, the machining tool must "show" a sharp edge that is at an angle of $\leq 90°$ from the direction of the feed at each edge of the cutting surface (i.e. at the cutting edges). Otherwise, the cutting edge may tear the material of the workpiece rather than cutting it, which may lead to an undesirably rough machined surface.

If the machining tool has a flat cutting surface, as presently available machining tool have and is used in an orientation with the cutting surface perpendicular to the machining path, then the cutting surface at both cutting edges is at an angle of 90° from the direction of the feed. However, if the machining tool is rotated such that the cutting surface is not perpendicular to the machining path, then the cutting surface at one cutting edge is turned forward and is at an angle of <90° from the direction of the feed, an acute angle, but the cutting surface at the other cutting edge is turned backward and is at an angle of >90° from the direction of the feed. Therefore, the cutting surface proximate to the backward cutting edge of this projected machining tool is desirably modified if the cutting surface at both cutting edges is to be at a desirable angle when the machining tool is rotated. A top-view of a machining tool with such a modified cutting surface has a concave cress section.

FIGS. 2A-D illustrate features of an exemplary machining tool 110 that may be used with exemplary precision machining systems of the present invention. FIG. 2A is a front view of exemplary machining tool 110, FIG. 2B is a side view of exemplary machining tool 110, and FIG. 2C is a top cut-away view of exemplary machining tool 110. FIG. 2D illustrates how the projected width of concave cutting surface 200 varies from a maximum, perpendicular, projected width 212 to reduced projected width 216 when machining tool 110 is rotated about its centerline by angle 214.

Cutting surface 200 of exemplary machining tool 110 includes two cutting edges 202, which meet at tip 204 of the machining tool. It is noted that other exemplary cutting surface shapes may be used, for example a cutting surface with a flat tip. Pointed cutting surface 200 shown in FIGS. 2A-D is merely illustrative and not limiting. However, all cutting surfaces include two cutting edges. As may be seen in FIG. 2C, cutting surface 200 has a concave cross section as viewed normal to the centerline of machining tool 110. In this exemplary embodiment, this concave cross section is a V shape with apex 206.

As shown in FIGS. 2B and 2C, another element of exemplary machining tool 110 that may become problematic is back surface 208. This surface also extends between cutting edges 202, but has a convex cross section as seen from above. An important consideration that is related to back surface 208 is clearance angle 210. If this angle is too small, then back surface 208 may extend beyond a cutting edge 202 when machining tool 110 is rotated, thus leading to a wider projected width than desired, as well as a likely degradation in machining quality.

Additional exemplary machining tools that may be used in exemplary embodiments of the present invention are described in a US patent application entitled "MACHINING TOOLS HAVING CONCAVE CUTTING SURFACES FOR PRECISION MACHINING AND METHODS OF MANUFACTURING SUCH" filed concurrently with the present application.

Returning to FIG. 1, tool spindle 114 is, thus, desirably controlled to rotate machining tool 110 about its centerline through a range of angles such that the plane tangent to the cutting surface at each cutting edge meets the machining path to form an acute angle, or a right angle, on the surface of the held workpiece. This may be done manually with a goniometer. Once the desired angle has been set, tool spindle 114 may desirably be locked in place using a standard locking mechanism for a rotational stage such as a set screw, etc.

Alternatively, machining path controller 120 may be electrically coupled to tool spindle 114 to control the width of the cutting surface of machining tool 110 projected normal to the machining path as the tip of machining tool 110 traverses the machining path. Machining path controller 120 may be used to set a desired projected width of the cutting surface of machining tool 110 at the beginning of the machining process and then the tool spindle may be left in that position throughout the machining process, or machining path controller 120 may actively control the projected width of the cutting surface as the tip of machining tool 110 traverses the machining path, possibly varying the projected width between different portions of the machining path.

As stated above, when utilizing the full capabilities of a four axis precision machining system, in conjunction STS or FTS, the system may have additional capabilities that diamond turning and fly-cutting alone do not have, such as much reduced tool lead-in and lead-out zones (transition zones) and the potential of machining curved grooves in the work pieces.

Figure 3:
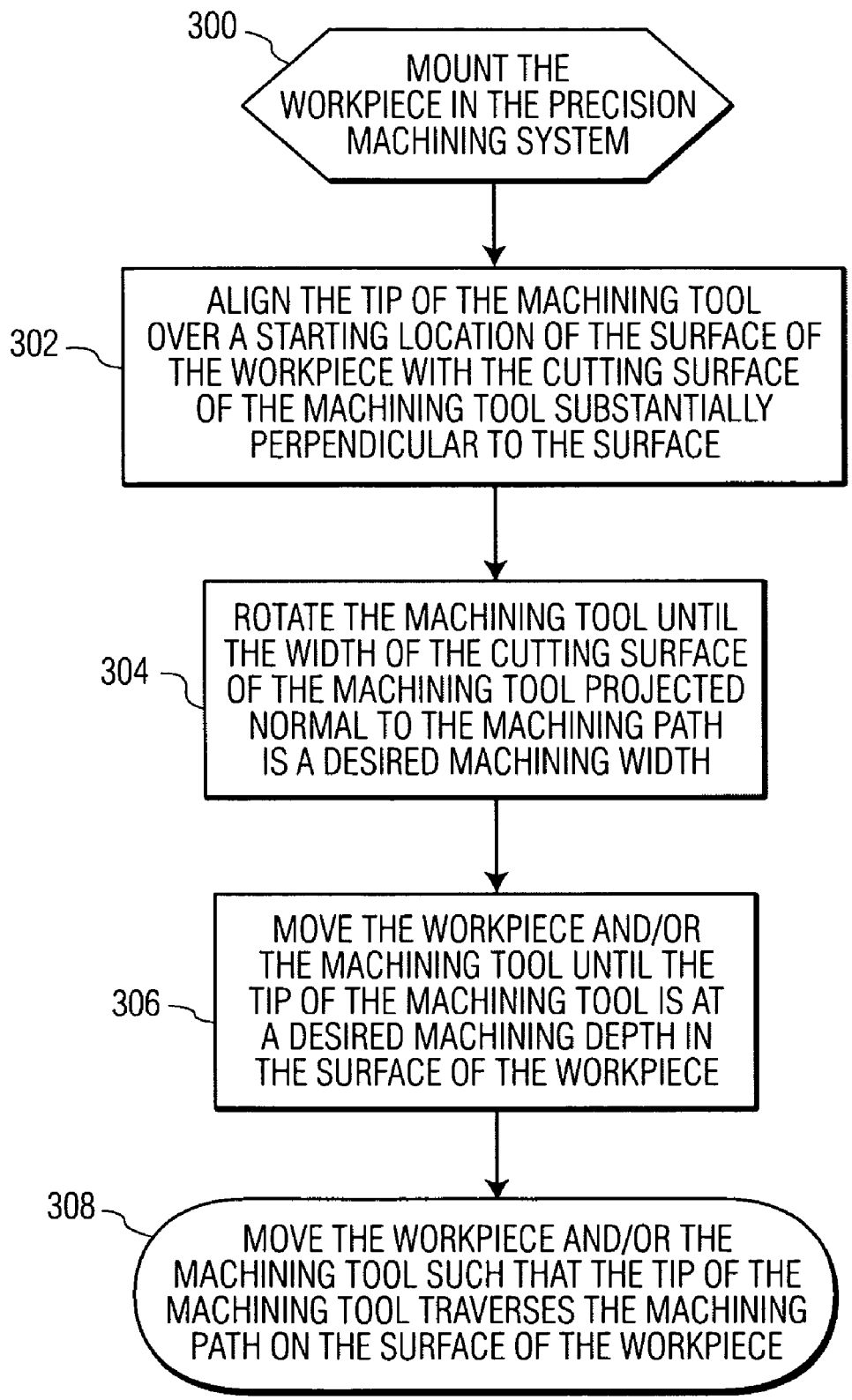
FIG. 3 is a flowchart illustrating an exemplary precision machining method according to the present invention.

FIG. 3 illustrates an exemplary method of machining a surface of a workpiece using a precision machining system adapted to project a cutting surface of a machining tool with a variable machining width, such as, for example the exemplary system of FIG. 1. It is noted that, although the exemplary system of FIG. 1 is particularly suited to use in this exemplary method, other precision machining systems may be used in this exemplary method by appropriate programming of the system controllers to coordinate movement of the translation and/or rotational stages of these systems.

The workpiece is mounted in the precision machining system, step 300. The tip of the machining tool is then aligned over a desired starting location of the surface of the workpiece, step 302. This desired starting location may be at a specific plunge location at which the machining tool is to be plunged into the surface of the workpiece or, more desirably, the starting location may be along an acceleration path on which the tip of the machining tool enters the surface of the workpiece to the desired machining depth and the machining tool is accelerated relative to the surface of the workpiece in the plane of the surface of the workpiece. The cutting surface of the machining tool is aligned to be substantially perpendicular to the surface of the workpiece. The machining tool is rotated about the axis of its centerline, which is substantially normal to the surface of the workpiece, step 304, until the width of the cutting surface of the machining tool projected normal to the machining path on the surface of the workpiece is the desired machining width.

The tip of the machining tool is then plunged a predetermined machining depth into the surface of the workpiece, step 306, by moving the workpiece and/or the machining tool in a direction substantially normal to the surface of the workpiece. As described above the tip of the tool may be plunged directly into the surface of the workpiece or, more desirably, the tip of the workpiece may cut into the surface of the workpiece as the workpiece is moved relative to the machining tool in a plane parallel to the surface of the workpiece. This latter method causes less wear on the material of the machining tool; however, it is the cause of the tool lead-in transition zone.

The workpiece and/or the machining tool are moved in the plane substantially parallel to the surface of the workpiece, step 308. This motion is coordinated so that the tip of the machining tool traverses the machining path on the surface of the workpiece. As described above with reference to FIG. 1, these coordinated movements may involve motion in two linear directions, in one linear direction and one rotational direction, or in two linear directions and one rotational direction. These motions may also be coordinated such that the machining speed with which the tip of the machining tool traverses the machining path on the surface of the workpiece is substantially constant, or they may be coordinated such that the machining speed varies in a predetermined manner, for example slowing at the beginning and end of the machining path to reduce the tool lead-in and lead-out transition zones.

Additionally, as tip of the machining tool traverses the machining path on the surface of the workpiece, the workpiece and/or the machining tool may be moved in a direction substantially normal to the surface of the workpiece or the machining tool may be rotated about its centerline axis. If the workpiece and/or the machining tool are moved in the substantially normal direction during processing, then the tip of the machining tool may be maintained substantially at the predetermined machining depth in the surface of the workpiece throughout the machining process. This may be particularly desirable for non-planar workpieces or for machining structures in which grooves of different depths are desired. Alternatively, this Z motion may be used to improve cutting when using a modified STS method.

If the machining tool may be rotated about its centerline axis, the width of the cutting surface of the machining tool projected normal to the machining path on the surface of the workpiece may be maintained substantially at a desired machining width throughout the machining process. This may be a constant machining width or it may a machining width that is different for different portions of the machining path. This feature of the exemplary embodiments of the invention may be particularly useful for machining diffractive optics, such as Fresnel lenses.

The present invention includes a number of exemplary precision machining systems and methods. Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A precision machining system with a variable projected machining width of a cutting surface of a machining tool, the precision machining system comprising:

a workpiece holder to hold a workpiece for machining;

a machining tool holder to hold the machining tool such that a Z axis is substantially parallel to a centerline axis of the machining tool;

a Z translation stage coupled to at least one of the workpiece holder or the machining tool holder to control a relative Z position of a tip of the machining tool and a surface of the held workpiece;

an X translation stage coupled to at least one of the workpiece holder or the machining tool holder;

a workpiece spindle coupled to the workpiece holder to rotate the workpiece about a workpiece axis parallel to the Z axis;

a machining path controller electrically coupled to the X translation stage and the workpiece spindle, the machining path controller controlling the X translation stage and the workpiece spindle such that the tip of the machining tool traverses a machining path on the surface of the held workpiece; and a tool spindle coupled to the machining tool holder and said machining path controller to actively rotate the machining tool to a desired position about the centerline axis of the machining tool for a portion of the machining process, wherein rotation of the machining tool varies a width of the cutting surface of the machining tool projected perpendicular to the machining path.

2. The precision machining system according to claim 1, wherein the machining tool holder includes vibration means to vibrate the machining tool substantially parallel to the Z axis.

3. The precision machining system according to claim 2, wherein the vibration means is at least one of a piezoelectric transducer, a linear motor, or a voice coil actuator.

4. The precision machining system according to claim 2, wherein the vibration means has a maximum travel distance of less than about 200 μm.

5. The precision machining system according to claim 2, wherein the vibration means has a bandwidth of less than about 2 KHz.

6. The precision machining system according to claim 1, wherein the machining tool is one of a diamond machining tool, a sapphire machining tool, a silicon-carbide machining tool, a tungsten machining tool, or a tungsten-carbide machining tool.

7. The precision machining system according to claim 1, wherein:

the cutting surface of the machining tool has a first side cutting edge and a second side cutting edge;

a cross section of the cutting surface of the machining tool normal to the centerline axis of the machining tool is concave between the first cutting edge and the second cutting edge; and the tool spindle is controlled to rotate the machining tool about the centerline axis of the machining tool through a range of angles such that;

a first plane tangent to the cutting surface at the first cutting edge meets the machining path to form one of an acute angle or a right angle on the surface of the held workpiece; and a second plane tangent to the cutting surface at the second cutting edge meets the machining path to form one of an acute angle or a right angle on the surface of the held workpiece.

8. The precision machining system according to claim 1, wherein the machining path controller is further electrically coupled to the Z translation stage to control the Z translation stage such that the tip of the machining tool maintains a predetermined machining depth in the surface of the held workpiece as the tip of the machining tool traverses the machining path on the surface.

9. The precision machining system according to claim 1, further comprising:

a Y translation stage coupled to at least one of the workpiece holder or the machining tool holder;

wherein the machining path controller is further electrically coupled to the Y translation stage and the machining path controller controls the X translation stage, Y translation stage, and the workpiece spindle such that the tip of the machining tool traverses the machining path on the surface of the held workpiece.

10. The precision machining system according to claim 1, wherein the machining path controller includes at least one of special purpose control circuitry, an application specific integrated circuit, a general purpose computer, or a digital signal processor.

11. The precision machining system according to claim 1, wherein the machining path controller controls the X translation stage and the workpiece spindle such that a speed with which the tip of the machining tool traverses the machining path on the surface of the held workpiece is maintained at a machining speed.

12. The precision machining system according to claim 11, wherein the machining path controller controls the X translation stage and the workpiece spindle such that the machining speed is reduced:

proximate to a starting point of the machining path on the surface of the held workpiece to reduce a lead-in transition length; and proximate to an ending point of the machining path to reduce a lead-out transition length.

13. The precision machining system according to claim 1, wherein machining path controller is further electrically coupled to the tool spindle to control the width of the cutting surface of the machining tool projected perpendicular to the machining path as the tip of the machining tool traverses the machining path on the surface of the held workpiece.

14. The precision machining system according to claim 1, wherein the tool spindle further includes a locking mechanism to lock the machining tool substantially at a predetermined angle to the machining path such that the width of the cutting surface of the machining tool projected perpendicular to the machining path is a predetermined width.

15. A precision machining system adapted to project a cutting surface of a machining tool with a variable machining width, comprising:

alignment means for aligning a tip of the machining tool over a surface of a workpiece such that the cutting surface of the machining tool is substantially perpendicular to the surface of the workpiece;

tool rotation means for actively rotating the machining tool to a desired position about an axis substantially normal to the surface of the workpiece for a portion of the machining process, wherein rotation of the machining tool varies a width of the cutting surface of the machining tool projected perpendicular to a machining path on the surface of the workpiece;

normal movement means for moving at least one of the workpiece or the machining tool in a direction substantially normal to the surface of the workpiece; and parallel movement means for moving at least one of the workpiece or the machining tool substantially parallel to the surface of the workpiece.

* * * * *